United States Patent
Urmanov et al.

(10) Patent No.: US 10,992,675 B2
(45) Date of Patent: Apr. 27, 2021

(54) ANOMALY DETECTION USING TRIPOINT ARBITRATION

(71) Applicant: ORACLE INTERNATIONAL CORPORATION, Redwood Shores, CA (US)

(72) Inventors: Aleksey Urmanov, San Diego, CA (US); Anton Bougaev, San Diego, CA (US)

(73) Assignee: Oracle International Corporation, Redwood Shores, CA (US)

( * ) Notice: Subject to any disclaimer, the term of this patent is extended or adjusted under 35 U.S.C. 154(b) by 581 days.

(21) Appl. No.: 15/843,641

(22) Filed: Dec. 15, 2017

(65) Prior Publication Data

US 2018/0109531 A1    Apr. 19, 2018

Related U.S. Application Data

(63) Continuation-in-part of application No. 14/251,867, filed on Apr. 14, 2014, now abandoned.

(51) Int. Cl.
| | |
|---|---|
| H04L 29/06 | (2006.01) |
| G06F 16/215 | (2019.01) |
| G06F 16/23 | (2019.01) |
| G06F 21/55 | (2013.01) |
| G06F 7/02 | (2006.01) |

(52) U.S. Cl.
CPC ............. *H04L 63/10* (2013.01); *G06F 7/02* (2013.01); *G06F 16/215* (2019.01); *G06F 16/2365* (2019.01); *G06F 21/554* (2013.01); *H04L 63/0227* (2013.01); *H04L 63/101* (2013.01)

(58) Field of Classification Search
None
See application file for complete search history.

(56) References Cited

U.S. PATENT DOCUMENTS

| | | | |
|---|---|---|---|
| 7,761,350 B1 | 7/2010 | Ridgeway | |
| 2002/0099675 A1* | 7/2002 | Agrafiotis | ............ G06K 9/6251 |
| | | | 706/15 |
| 2008/0010304 A1 | 1/2008 | Vempala | |
| 2010/0268754 A1* | 10/2010 | Holton | ................. G06Q 10/107 |
| | | | 709/203 |

FOREIGN PATENT DOCUMENTS

| | | |
|---|---|---|
| WO | WO-9957686 A1 | 11/1999 |

OTHER PUBLICATIONS

Hale Erten; Triangulations with Locally Optimal Steiner Points; Eurographics Symposium on Geometry Processing; 2007; pp. 1-10.*

(Continued)

*Primary Examiner* — Mariela Reyes
*Assistant Examiner* — Jermaine A Mincey
(74) *Attorney, Agent, or Firm* — Kraguljac Law Group, LLC

(57) ABSTRACT

Systems, methods, and other embodiments associated with anomaly detection using tripoint arbitration are described. In one embodiment, a method includes identifying a set of clusters that correspond to a nominal sample of data points in a sample space. A point z is determined to be an anomaly with respect to the nominal sample when, for each cluster, a tripoint arbitration similarity between data points in the cluster calculated with z as arbiter is greater than a threshold.

19 Claims, 6 Drawing Sheets

(56) References Cited

OTHER PUBLICATIONS

Yang Zhou; Graph Clustering Based on Structural/Attribute Similarities; ACM; 2009; pp. 1-12.*
Harvey J Motulsky; Detecting outliers when fitting data with nonlinear regression—a new method based on robust nonlinear regression and the false discovery rate; 2006' BMC Bioinformatics; pp. 1-20 (Year: 2006).*
U.S. Patent and Trademark Final Office Action in co-pending U.S. Appl. No. 13/969,771, filed Aug. 19, 2013, dated Feb. 28, 2018.
Hal Erten et al., Triangulations with Locally Optimal Steiner Points, pp. 1-10; Eurographics Symposium on Geometry Processing (2007).
Yang Zhou et al., Graph Clustering Based on Structural/Attribute Similarities; pp. 1-12; Journal Proceedings of the VLDB Endowment VLDB Endowment Hompage archive; vol. 2 Issue 1, Aug. 2009.
U.S. Patent and Trademark Final Office Action in co-pending U.S. Appl. No. 14/669,729, filed Mar. 26, 2015; dated May 9, 2018.
U.S. Patent and Trademark Final Office Action in co-pending U.S. Appl. No. 14/669,792, filed Mar. 26, 2015; dated Apr. 18, 2018.
Heinrich, et al., Multi-Distance Motion Vector Clustering Algorithm for Video-Based Sleep Analysis, 15th Intl. Conference on e-Health Networking, Applications and Services (Healthcom 2013) (Year: 2013) pp. 223-227.

* cited by examiner $$S_a(x_1, x_2 | a) = \frac{\min \{\rho(x_1, a), \rho(x_2, a)\} - \rho(x_1, x_2)}{\max \{\rho(x_1, x_2), \min \{\rho(x_1, a), \rho(x_2, a)\}\}}$$

ANOMALY DETECTION USING TRIPOINT ARBITRATION

CROSS REFERENCE TO RELATED APPLICATIONS

This application claims priority to and is a continuation-in-part of U.S. patent application Ser. No. 14/251,867, filed on Apr. 14, 2014 and titled "ANOMALY DETECTION USING TRIPOINT ARBITRATION", which is incorporated herein by reference.

BACKGROUND

Anomaly or outlier detection is one of the practical problems of data analysis. Anomaly detection is applied in a wide range of technologies, including cleansing of data in statistical hypothesis testing and modeling, performance degradation detection in systems prognostics, workload characterization and performance optimization for computing infrastructures, intrusion detection in network security applications, medical diagnosis and clinical trials, social network analysis and marketing, optimization of investment strategies, filtering of financial market data, and fraud detection in insurance and e-commerce applications. Methods for anomaly detection typically utilize statistical approaches such as hypothesis testing and machine learning such as on-class classification and clustering.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
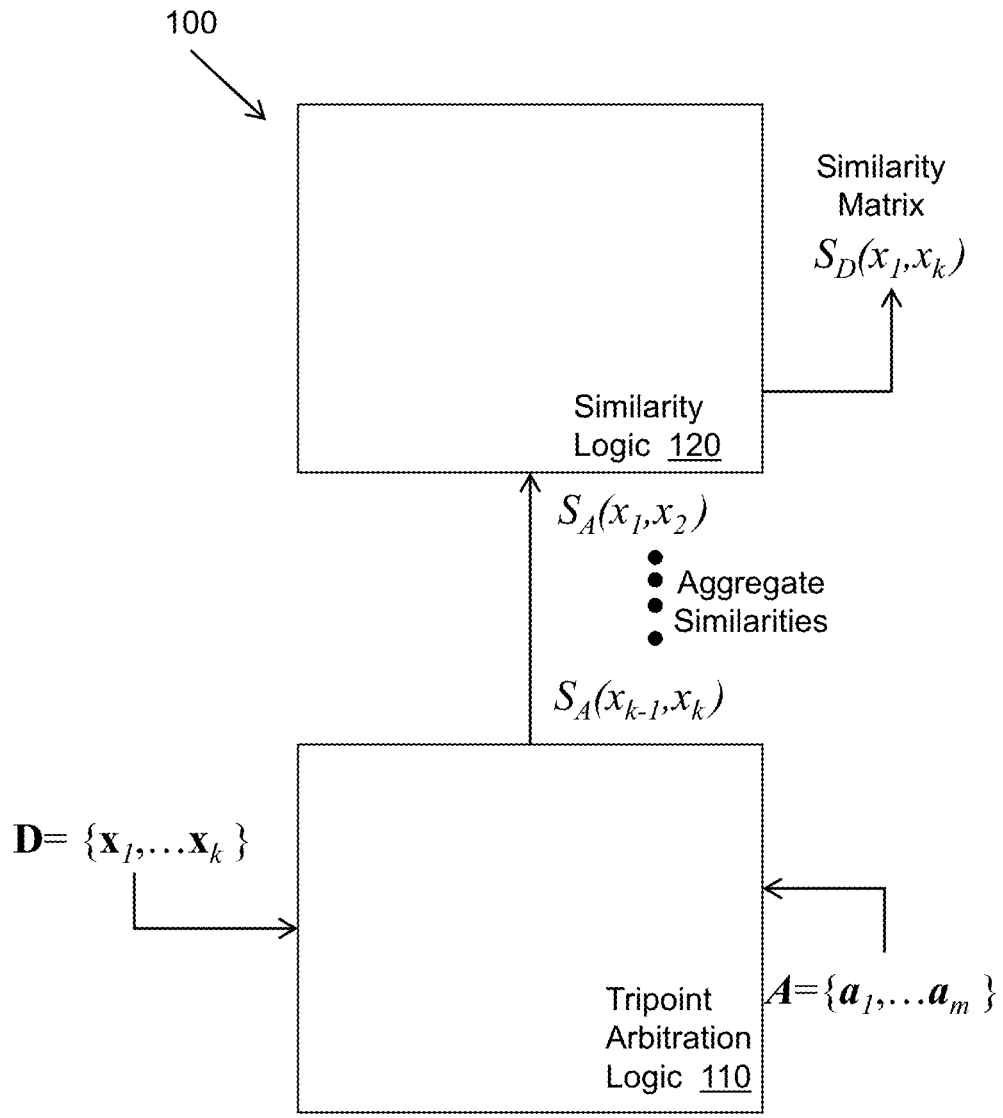
FIG. 1 illustrates one embodiment of a system that determines similarity using tripoint arbitration.

An anomaly is defined qualitatively as an observation that significantly deviates from the rest of a data sample (hereinafter the "nominal" sample). To quantify "significant" deviation, a model is created that represents the nominal sample. Deviation from the model is computed given some false detection rate (type I error). In those rare cases in which instances of actual anomalies are available in quantities sufficient to create a model describing the outlier observations, likelihood ratio-based statistical tests and two-class classification can be used with a specified missed detection rate (type II error).

Distributional and possibly other data-generating assumptions and tuning of various critical parameters are required to use existing anomaly detection methods. For example, when using the Mahalanobis distance, a multivariate Gaussian assumption is made for the data generating mechanism. When using clustering, a number of clusters must be specified and a specific cluster formation mechanism must be assumed. The reliance of anomaly detection methods on assumptions about the underlying data and the tuning of statistical parameters, such as the number of clusters, means that these methods require an experienced system administrator to set up and maintain them.

The analysis becomes more laborious when observations are represented by heterogeneous data. For instance, a health monitoring system of a computing infrastructure that provides cloud services must continuously monitor diverse types of data about thousands of targets. The monitored data may include physical sensors, soft error rates of communication links, data paths, memory modules, network traffic patterns, internal software state variables, performance indicators, log files, workloads, user activities, and so on, all combined within a time interval. An anomaly detection system consumes all this data and alerts the system administrator about anomalously behaving targets. In such environments it is unpractical to expect that the system administrator will possess sufficient skills to set and tune various anomaly detection parameters associated to detect anomalies in heterogeneous data from such diverse sources.

At a basic level, detecting an anomaly involves determining that an observed data point is significantly dissimilar to the nominal sample. As can be seen from the discussion about existing anomaly detection methods, traditionally, a determination as to what constitutes an anomaly with respect to some data set is made by an analyst outside the data set making some assumptions about the nominal sample. The accuracy of these assumptions depend upon skill and an inaccurate model may introduce error into the anomaly detection effort. Systems and methods are described herein that provide anomaly detection based on similarity analysis performed using tripoint arbitration. Rather than determining dissimilarity of a possibly anomalous data point with respect to a nominal data set as modeled by an external analyst, tripoint arbitration determines dissimilarity based on unbiased observations of similarity as between the data point and points in the nominal data set. The similarity of data points is determined using a distance function that is selected based on the type of data.

Tripoint arbitration determines the similarity of a pair of data points by using other points in the sample to evaluate the similarity of the pair of data points. The similarity of the pair of points is aggregated over all observers in the sample to produce an aggregate tripoint arbitration similarity that represents the relative similarity between the pair of points, as judged by other points in the sample. The term "data point" is used in the most generic sense and can represent points in a multidimensional metric space, images, sound and video streams, free texts, genome sequences, collections of structured or unstructured data of various types. The following description has three parts. The first part reviews how tripoint arbitration similarity is calculated. The second part describes how tripoint arbitration can be used to initially cluster a data sample to provide sets of nominal samples to facilitate anomaly detection. The third part describes how tripoint arbitration can be used in anomaly detection.

Similarity Analysis Using Tripoint Arbitration

With reference to FIG. 1, one embodiment of a system 100 that performs similarity analysis using tripoint arbitration is illustrated. The system 100 inputs a set D of data points, $\{x_1, \ldots, x_k\}$ and calculates a similarity matrix $S_D$ using tripoint arbitration. The system 100 includes a tripoint arbitration logic 110 and a similarity logic 120. The tripoint arbitration logic 110 calculates a per-arbiter similarity as follows. The tripoint arbitration logic 110 selects a data point pair $(x_1, x_2)$ from the data set. The tripoint arbitration logic 110 also selects an arbiter point $(a_1)$ from a set of arbiter points, A. Various examples of sets of arbiter points will be described in more detail below. The tripoint arbitration logic 110 calculates the per-arbiter similarity for the data point pair based, at least in part, on a distance between the first and second data points and the selected arbiter point $a_1$.

Figure 2:
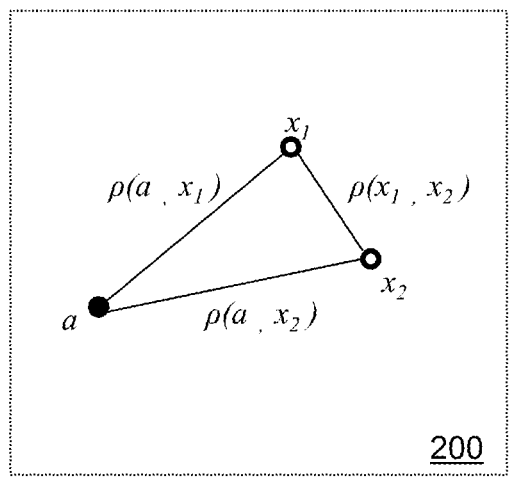
FIG. 2 illustrates an example of tripoint similarity for two dimensional, numeric data points.

Turning now to FIG. 2, the tripoint arbitration technique to compute a per-arbiter similarity for two dimensional numerical data is illustrated. A plot 200 illustrates a spatial relationship between the data points in the data point pair $(x_1, x_2)$ and an arbiter point a. Note that the data points and the arbiter point will typically have many more dimensions than the two shown in the simple example plot 200, but the same distance based technique is used to calculate the per-pair per-arbiter similarity. The data points and arbiter points may be points or sets in multi-dimensional metric spaces, time series, or other collections of temporal nature, free text descriptions, and various transformations of these. A per-arbiter similarity $S_a$ for data points $(x_1, x_2)$ with respect to arbiter point a is calculated as shown in 210, where p designates a two-point distance determined according to any appropriate technique:

$$S_a(x_1, x_2 \mid a) = \frac{\min\{\rho(x_1, a), \rho(x_2, a)\} - \rho(x_1, x_2)}{\max\{\rho(x_1, x_2), \min\{\rho(x_1, a), \rho(x_2, a)\}\}} \quad \text{EQ. 1}$$

Thus, the tripoint arbitration technique illustrated in FIG. 2 calculates the per-arbiter similarity based on a first distance between the first and second data points, a second distance between the arbiter point and the first data point, and a third distance between the arbiter point and the second data point.

Values for the per-arbiter similarity, $S_a(x_1, x_2)$, range from $-1$ to $1$. In terms of similarities, $S_a(x_1, x_2) > 0$ when both distances from the arbiter to either data point are greater than the distance between the data points. In this situation, the data points are closer to each other than to the arbiter. Thus a positive similarity indicates similarity between the data points, and the magnitude of the similarity indicates a level of similarity. $S_a(x_1, x_2) = +1$ indicates a highest level of similarity, where the two data points are coincident with one another.

In terms of dissimilarity, $S_a(x_1, x_2) < 0$ results when the distance between the arbiter and one of the data points is less than the distance between the data points. In this situation, the arbiter is closer to one of the data points than the data points are to each other. Thus a negative similarity indicates dissimilarity between the data points, and the magnitude of the negative similarity indicates a level of dissimilarity. $S_a(x_1, x_2) = -1$ indicates a complete dissimilarity between the data points, when the arbiter coincides with one of the data points.

A similarity equal to zero results when the arbiter and data points are equidistant from one another. Thus $S_a(x_1, x_2) = 0$ designates complete indifference with respect to the arbiter point, meaning that the arbiter point cannot determine whether the points in the data point pair are similar or dissimilar.

Tripoint arbitration similarity depends on a notion of distance between the pair of data points being analyzed and the arbiter point. Any technique for determining a distance between data points may be employed when using tripoint arbitration to compute the similarity. Distances may be calculated differently depending on whether a data point has attributes that have a numerical value, a binary value, or a categorical value. In one embodiment, values of a multi-modal data point's attributes are converted into a numerical value and a Euclidean distance may be calculated. In general, some sort of distance is used to determine a similarity ranging between $-1$ and $1$ for various attributes of a pair of points using a given arbiter point. A few examples of techniques for determining a distance and/or a similarity for common types of data types follow.

Put another way, the similarity between binary attributes of a data point pair can be determined as 1 if a Hamming distance between $(x_1)$ and $(x_2)$ is less than both a Hamming distance between $(x_1)$ and $(a)$ and a Hamming distance between $(x_2)$ and $(a)$. The similarity between binary attributes of a data point pair can be determined as $-1$ if the Hamming distance between $(x_1)$ and $(x_2)$ is greater than either the Hamming distance between $(x1)$ and $(a)$ or the Hamming distance between $(x_2)$ and $(a)$. The similarity between binary attributes of a data point pair can be determined as 0 (or undefined) if a Hamming distance between $(x_1)$ and $(x_2)$ is equal to both the Hamming distance between $(x_1)$ and $(a)$ and the Hamming distance between $(x_2)$ and $(a)$.

For categorical data where values are selected from a finite set of values such as types of employment, types of disease, grades, ranges of numerical data, and so on, the distance can be assigned a value of 1 if a pair of points has the same value or $-1$ if the pair of points has different values. However, the similarity for the pair of points might be different depending on the arbiter point's value. If the pair of points have different values, regardless of the arbiter's value (which will coincide with the value of one of the points), then the similarity is determined to be $-1$. If the pair of points have the same value and the arbiter point has a different value, the similarity is determined to be 1. If the pair of points and the arbiter point all have the same value, the similarity may be determined to be 0, or the similarity for this arbiter and this pair of points may be excluded from the similarity metric computed for the pair of points. Based on a priori assumptions about similarity between category values, fractional similarities may be assigned to data point values that express degrees of similarity. For example, for data points whose values include several types of diseases and grades of each disease type, a similarity of ½ may be assigned to data points having the same disease type, but a different grade.

A set of if-then rules may be used to assign a similarity to data point pairs given arbiter values. For example, if a data point can have the values of cat, dog, fish, monkey, or bird, a rule can specify that a similarity of ⅓ is assigned if the data points are cat and dog and the arbiter point is monkey. Another rule can specify that a similarity of $-⅔$ is assigned if the data points are cat and fish and the arbiter point is dog. In this manner, any assumptions about similarity between category values can be captured by the similarity.

Since the similarity ranges from $-1$ to $1$ for any mode or type of data attribute, it is possible to combine similarities of different modalities of multimodal data into a single similarity. For modal similarities with the same sign, the overall similarity becomes bigger than either of the modal similarities but still remains ≤1. Modal similarities for modes 1 and 2 when both are positive can be combined as:

$$S_a(x_i, x_j) = s_{a(1)}(x_i(1), x_j(1)) + s_{a(2)}(x_i(2), x_j(2)) - s_{a(1)}(x_i(1), x_j(1)) \cdot s_{a(2)}(x_i(2), x_j(2))$$
EQ. 2

When both modal similarities for modes 1 and 2 are negative, the modal similarities can be combined as:

$$S_a(x_i, x_j) = s_{a(1)}(x_i(1), x_j(1)) + s_{a(2)}(x_i(2), x_j(2)) + s_{a(1)}(x_i(1), x_j(1)) \cdot s_{a(2)}(x_i(2), x_j(2))$$
EQ. 3

When modal similarities have different signs, the overall similarity is determined by the maximum absolute value but the degree of similarity weakens:

$$S_a(x_i, x_j) = \frac{s_{a(1)}(x_{i(1)}, x_{j(1)}) + s_{a(2)}(x_{i(2)}, x_{j(2)})}{1 - \min(|s_{a(1)}(x_{i(1)}, x_{j(1)})|, |s_{a(2)}(x_{i(2)}, x_{j(2)})|)}$$
EQ. 4

Thus, for each arbiter, the similarity $S_a$ between $x_i$ and $x_j$ can be determined by combining similarities for $x_i$ and $x_j$ determined for each mode of data. When both Returning to FIG. 1, the tripoint arbitration logic 110 calculates additional respective per-arbiter similarities for the data point pair $(x_1, x_2)$ based on the remaining respective arbiter points $(a_2-a_m)$. The similarities for the data pair are combined in a selected manner to create an aggregate similarity for the data point pair. The aggregate similarity for the data point pair, denoted $S_A(x_1, x_2)$, is provided to the similarity logic 120. The tripoint arbitration logic 110 computes aggregate similarities for the other data point pairs in the data set and also provides those aggregate similarities $S_A(x_2, x_3), \ldots, S_A(x_{k-1}, x_k)$ to the similarity logic 120.

As already discussed above, the arbiter point(s) represent the data set rather than an external analyst. There are several ways in which a set of arbiter points may be selected. The set of arbiter points A may represent the data set based on an empirical observation of the data set. For example, the set of arbiter points may include all points in the data set. The set of arbiter points may include selected data points that are weighted when combined to reflect a contribution of the data point to the overall data set. The aggregate similarity based on a set of arbiter points that are an empirical representation of the data set (denoted $S_A(x_1, x_j)$) may be calculated as follows:

$$S_A(x_1, x_2) = \frac{1}{m} \sum_{k=1}^{m} S_{a_k}(x_i, x_j)$$
EQ. 5

Variations of aggregation of arbiter points including various weighting schemes may be used. Other examples of aggregation may include majority/minority voting, computing median, and so on.

The similarity logic 120 determines a similarity metric for the data set based, at least in part, on the aggregate similarities for the data point pairs. In one embodiment, the similarity metric is the pairwise matrix, $S_D$, of aggregate similarities, which has the empirical formulation:

$$S_D = \begin{bmatrix} S_A(x_1, x_1) & \ldots & S_A(x_1, x_k) \\ S_A(x_2, x_1) & \ldots & S_A(x_2, x_k) \\ \ldots \\ S_A(x_k, x_1) & \ldots & S_A(x_k, x_k) \end{bmatrix}$$
EQ. 6

The illustrated pairwise $S_D$ matrix arranges the aggregate similarities for the data points in rows and columns where rows have a common first data point and columns have a common second data point. When searching for data points that are similar to a target data point within the data set, either the row or column for the target data point will contain similarities for the other data points with respect to the target data point. High positive coefficients in either the target data point's row or column may be identified to determine the most similar data points to the target data point. Further, the pairwise $S_D$ matrix can be used for any number of applications, including clustering and classification that are based on a matrix of pairwise distances. The matrix may also be used as the proxy for the similarity/dissimilarity of the pairs for clustering and anomaly detection.

Clustering Using Tripoint Arbitration

It may be advantageous to perform anomaly detection analysis with respect to individual clusters of data from the nominal sample rather than the nominal sample taken as a whole. This allows detection of anomalies with values that fall between values seen in individual clusters of nominal data that might otherwise go undetected if compared to the nominal sample as a whole. The anomaly detection described in more detail below can be performed on an un-clustered nominal sample or on a nominal sample that has been clustered using any technique. One way in which clustering can be performed on the nominal sample uses tripoint arbitration as follows.

Clustering can use tripoint arbitration to evaluate the similarity between the data points. Rather than an analyst artificially specifying a distance that is "close enough," a number of clusters, a size of cluster, or a cluster forming property such as density of points, in the disclosed data clustering each data point contributes to the determination of the similarity of all other pairs of data points. In one embodiment, the similarity determinations made by the data points are accumulated, and pairs of data points that are determined to be similar by some aggregation of arbiters, such as a majority rule, are grouped in the same cluster. Aggregation can be based on any sort of distance metric or other criterion, and each attribute or a group of attributes can be evaluated separately when aggregating. The analyst may alter the behavior of the aggregation rules, such a majority thresholds, but these parameters can be based on statistical analysis of the probability that randomly selected data would be voted to be similar, rather than on the analyst's intuition. Thus, the data, rather than the analyst, controls the cluster formation.

Given the similarity matrix $S_D$ output by the similarity analysis just described, the clustering problem can be formulated as follows: Given a set of points $D = \{x_1, x_2, \ldots, x_n\}$, where $x_i \in R^m$, the problem is to partition D into an unknown number of clusters $C_1, C_2, \ldots, C_L$ so that points in the same cluster are similar to each other and points in different clusters are dissimilar with respect to each other. This clustering problem can be cast as an optimization problem that can be efficiently solved using matrix spectral analysis methods. In one embodiment, clustering is performed according to the following three constraints.

I. min $J(C_1, C_2, \ldots, C_L)$ (i.e., the number of clusters is minimized)

II. Intra-cluster Similarity Constraint: $S_D(C_p, C_p) \geq 0$, where $1 \leq p \leq L$ (i.e., the average similarity of pairs of points in any given cluster is positive).

III. Inter-cluster Dissimilarity Constraint: $S_D(C_p, C_q) \leq 0$, where $1 \leq p \leq z \leq L$ (i.e., the average similarity of pairs of points belonging to different clusters is negative).

$S_D(C_p, C_p)$ denotes the average similarity for pairs of points, where both points are members of cluster p. $S_D(C_p, C_q)$ denotes the average similarity for pairs of points, where one point is a member of cluster p and the other point is a member of cluster q. The average similarity $S_D(C_p, C_q)$ is calculated as shown in Equation 7.

$$S_D(C_p, C_q) = \frac{1}{|C_p||C_q|} \sum_{i:x_i \in C_p} \sum_{j:x_j \in C_q} S_D(x_i, x_j) \qquad \text{EQ. 7}$$

With respect to constraint number I, the objective function J is constructed to simultaneously minimize constraint III while maximizing constraint II. In this manner, clusters are chosen such that the similarity between points in different clusters is minimized while the similarity between points in the same cluster is maximized. One objective function J, which is a type of MinMaxCut function, is:

$$J = \sum_{1 \leq p < q \leq L} \frac{S_D(C_p, C_q)}{S_D(C_p, C_p)} + \frac{S_D(C_p, C_q)}{S_D(C_q, C_q)} \qquad \text{EQ. 8}$$

Figure 3:
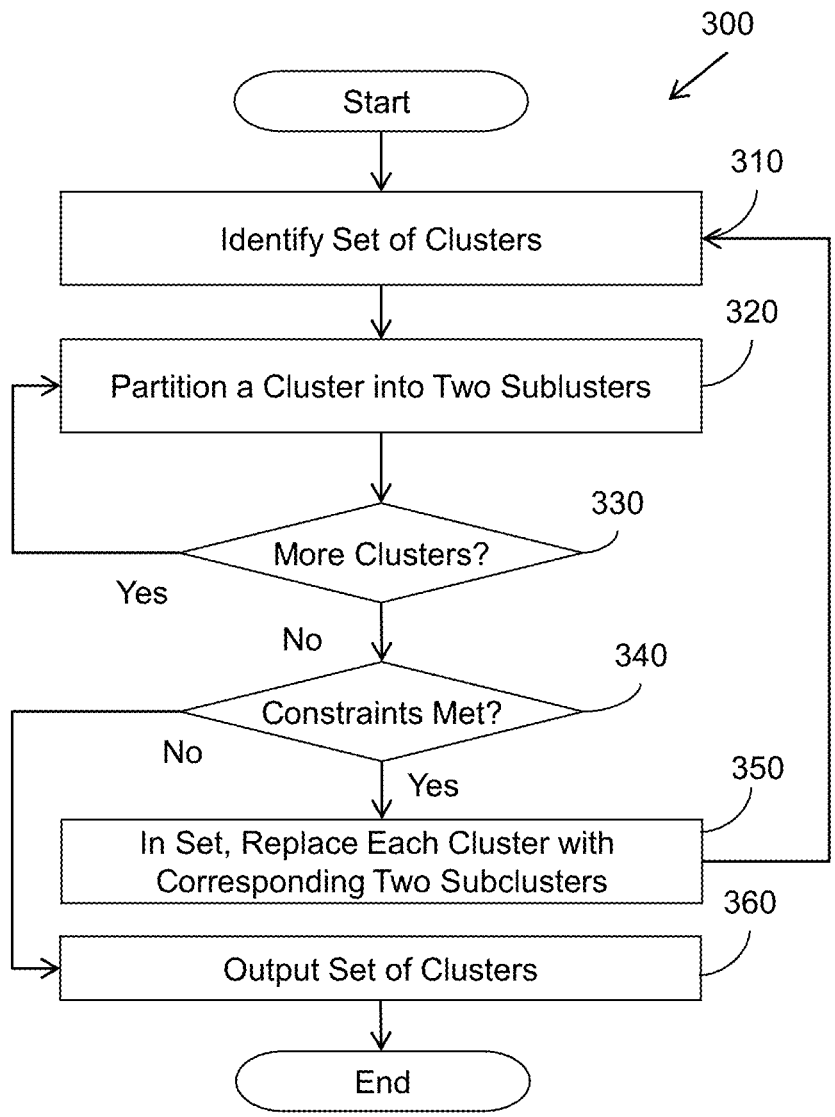
FIG. 3 illustrates one embodiment of a method associated with clustering using tripoint arbitration.

FIG. 3 illustrates a method 300 that takes an iterative approach to solving Equation 8. The method 300 can be used find an appropriate number of clusters L. The method 300 uses, as it input, the similarity matrix $S_D$ that has entries corresponding to tripoint arbitration aggregate similarities for all data points in the nominal sample using arbiter points representative of the overall nominal sample D. At 310, the method includes identifying a current set of clusters, which in the initial iteration is a single "cluster" comprising the entire nominal sample D. At 320, a cluster from the set of clusters is partitioned into two subclusters based, at least in part, on tripoint arbitration similarities between data point pairs in the cluster as can be found in the matrix $S_D$. In one embodiment, the partitioning is performed using Equation 7. At 330, a determination is made as to whether all clusters in the set of clusters have been partitioned. If not, the method returns to 320 and another cluster is partitioned into two subclusters until all clusters have been partitioned.

At 340, the constraints II and III are checked with respect to all the subclusters. If the constraints are met, at 350 each of the clusters in the set of clusters is replaced with the corresponding two subclusters and the method returns to 310. Thus, in a second iteration each of the two clusters is partitioned in two and so on. If the constraints II and III are not met, at 360 the set of clusters, not the subclusters, is output and the method ends. In this manner, violation of the constraints serves as a stopping criterion. The process of splitting clusters is stopped when no more clusters can be split without violating the intra-cluster similarity constraint or the inter-cluster dissimilarity constraint. This iterative approach automatically produces the appropriate number of clusters. In one embodiment, tripoint arbitration based clustering is performed using matrix spectral analysis results to iteratively find the appropriate number of clusters by solving equation 7.

Anomaly Detection Using Tripoint Arbitration

Anomaly detection using tripoint arbitration can be facilitated by first clustering the nominal sample to produce clusters of data points from the nominal sample that are more similar to each other than they are to members of other clusters. The clustering may be performed using any clustering algorithm including, preferably, tripoint arbitration based clustering as described above. The remainder of the description will describe anomaly detection using a clustered nominal sample. In some embodiments, the nominal sample may not be clustered and the following technique is performed as though the nominal sample was itself a single cluster.

The tripoint arbitration based clustering just described determines a possible global structure in nominal data intended for use in anomaly detection and automatically finds an appropriate number of clusters for the nominal data. The clusters are labeled with cluster labels l=1, 2, L. The resulting clusters C1, C2, ..., CL constitute the nominal sample for anomaly detection.

When tripoint arbitration based similarity analysis is used to detect anomalies, an anomalous point is defined as an arbiter point for which all points in the nominal sample have a similarity above a given threshold. Stated differently, an anomaly is a data point for which all pairs of data points in the nominal sample cluster have a higher similarity with respect to each other than with respect to the data point.

Figure 4:
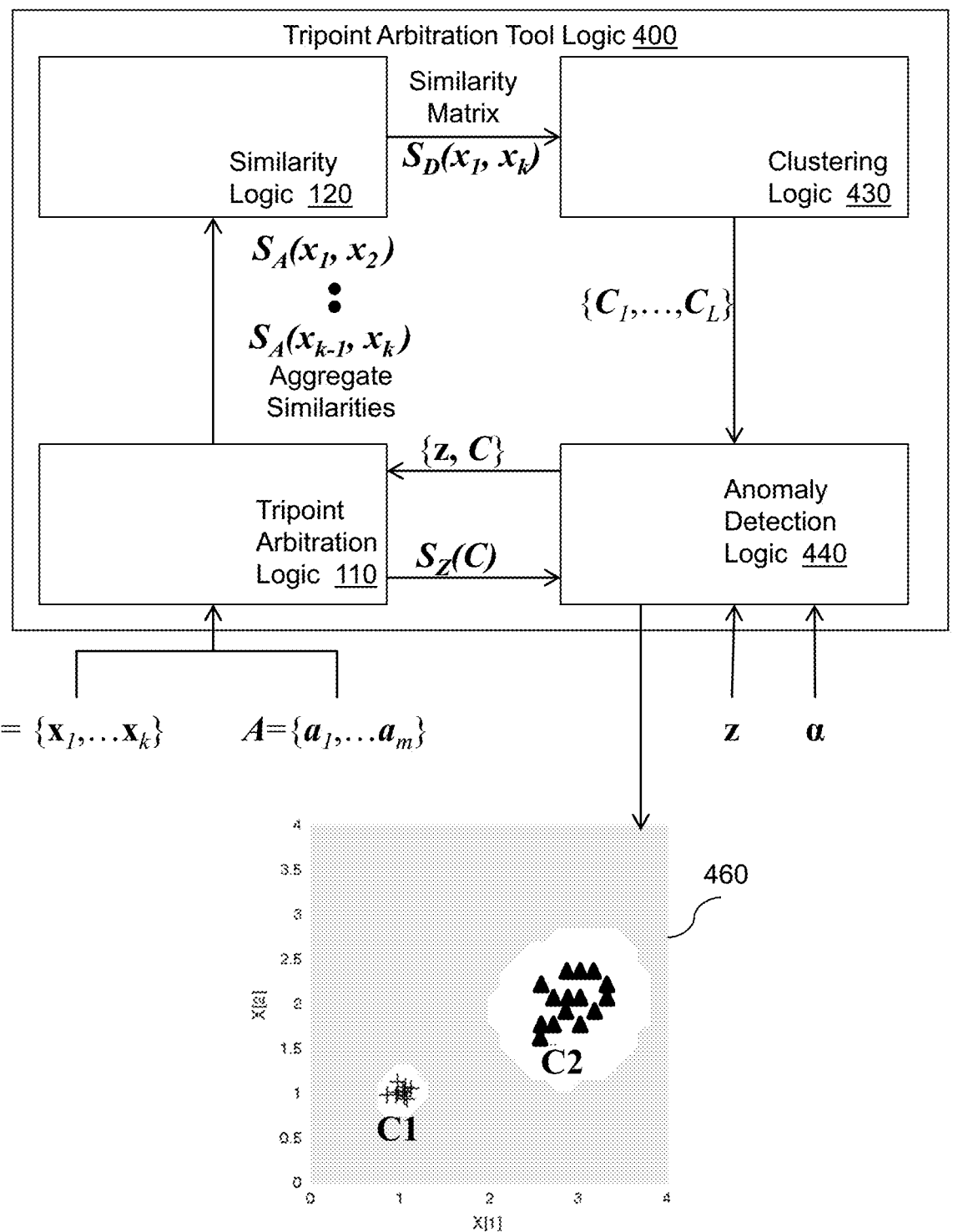
FIG. 4 illustrates an embodiment of a system associated with anomaly detection using tripoint arbitration.

FIG. 4 illustrates one embodiment of a tripoint arbitration tool logic 400 that uses tripoint arbitration to perform similarity analysis, clustering, and anomaly detection. The tripoint arbitration tool logic 400 includes the tripoint arbitration logic 110 and the similarity logic 120 described with respect to FIG. 1. Recall that the tripoint arbitration logic 110 inputs a nominal sample D from a data space and a set of arbiter points A that may be selected from D. The tripoint arbitration logic 110 is configured to use tripoint arbitration to calculate aggregate similarities $S_A$ for all pairwise combinations of data points in D. The similarity logic arranges the aggregate similarities into the similarity matrix $S_D$.

Clustering logic 430 is configured to cluster the nominal sample D into one or more clusters based, at least in part, on the similarities $S_A$ between data point pairs in the similarity matrix $S_D$. The clustering logic 430 may perform the method 300 described above to cluster the nominal sample D into L clusters $C_1$-$C_L$. In some embodiments, the clustering logic 430 uses a different technique to analyze the similarity matrix $S_D$ and output an appropriate number of clusters. Plot 460 illustrates a two dimensional sample space {(0,0)-(4,4)} with data points in the nominal sample D represented by crosses or triangles. The sample D has been clustered by the clustering logic 430 into two clusters C1 and C2.

Anomaly detection logic 440 is configured to determine if an input point z is an anomaly with respect to D, given a desired false error rate α. The anomaly detection logic 440 determines if z is an anomaly by determining if a similarity between points in each cluster, as determined using z as the arbiter point, is above a threshold. In one embodiment, the anomaly detection logic 440 provides z and the data points as assigned to clusters C1-CL to the tripoint arbitration logic 110. All of the data points in each cluster may be provided for analysis, or a sample of data points from each cluster may be provided for analysis, or some other representative data points for a cluster may be provided for analysis. If the aggregate similarity using z as arbiter for data points in each cluster is above the threshold, z is determined to be an anomaly.

In one embodiment, rather than calculating $S_z$ for each input z, the anomaly detection logic 440 defines an anomaly region in the sample space using tripoint arbitration on the clusters $C_1$-$C_L$. The anomaly region for the example data set is shaded in the sample space 460. To define the region, for each cluster, the anomaly detection logic 440 defines a range of data values in the sample space such that data points having values in the range will, when used as an arbiter point, result in a tripoint arbitration similarity between data points in the cluster that is greater than the threshold. An intersection of the respective ranges for the respective clusters is then defined as the anomaly region. If a potentially anomalous point z has value that falls in the anomaly region, the anomaly detection logic 440 can quickly determine z to be an anomaly with respect to the nominal sample.

In summary, the anomaly detection logic 440 determines whether a point z is anomalous when the following constraint is met:

$$S_Z(C_l) = \frac{1}{|C_l|} \sum_{i,j} S_Z(x_i, x_j) > t_\alpha, i, j : x_i, x_j \in C_l \qquad \text{EQ. 9}$$

The threshold $t_\alpha$ against which the similarity $S_z$ is compared is based on a false detection rate denoted $\alpha$. The exact sampling distribution of $S_z$ can be determined through Monte-Carlo simulations or asymptotic distribution theory. An approximation of the distribution of $S_z$ as a multivariate Gaussian distribution having n points per cluster yields the following table, which sets out a threshold $t_\alpha$ on $S_z$ that will detect anomalies with a false detection rate of $\alpha$.

TABLE 1

| $t_\alpha$ | $\alpha = 0.5$ | $\alpha = 0.1$ | $\alpha = 0.05$ | $\alpha = 0.01$ | $\alpha = 0.005$ |
|---|---|---|---|---|---|
| n = 10 | −0.32 | 0.26 | | | |
| n = 20 | −0.3 | 0.15 | 0.28 | 0.4 | |
| n = 50 | −0.25 | 0.04 | 0.16 | 0.32 | |
| n = 100 | −0.25 | 0.04 | 0.16 | 0.32 | 0.36 |
| n = 5000 | −0.25 | 0.04 | 0.15 | 0.32 | 0.3 |

For most practical implementations, setting $t_\alpha=0.5$ will assure a false detection rate of less than 1%.

Figure 5:
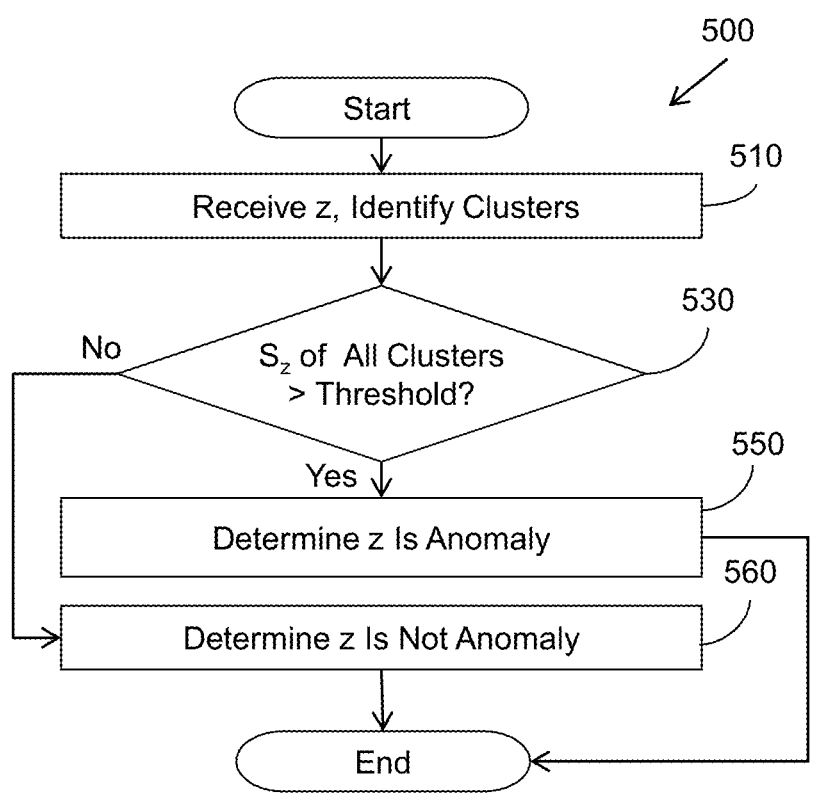
FIG. 5 illustrates an embodiment of a method for detecting anomalies using tripoint arbitration.

FIG. 5 illustrates one embodiment of a method 500 that detects anomalies using tripoint arbitration. The method includes, at 510, receiving a data point z and identifying a set of clusters that correspond to a nominal sample of data points in a sample space. At 530, a determination is made as to whether a tripoint arbitration similarity between data points in the clusters calculated with z as arbiter is greater than a threshold. At 550, when, for each cluster, the tripoint arbitration similarity between data points in the cluster calculated with z as arbiter is greater than a threshold, z is determined to be an anomaly with respect to the nominal sample. When at 530 the tripoint arbitration similarity between data points in each cluster calculated with z as arbiter is not greater than the threshold, at 560 z is determined to be an anomaly with respect to the nominal sample.

In one embodiment, the tripoint arbitration similarity between data points in a cluster with z as arbiter is calculated by selecting, from the cluster, data point pairs corresponding to pairwise combinations of data points in the cluster. For each data point pair a respective z-based per-pair tripoint arbitration similarity is calculated for the data point pair using z as an arbiter point. The z-based per-pair tripoint arbitration similarities are combined to calculate the tripoint arbitration similarity between the data points in the cluster with z as the arbiter. The tripoint arbitration similarity is compared to a threshold to determine if z is an anomaly. In some embodiments, similarities between all pairwise combinations of data points in the cluster are calculated while in other embodiments, a subset of pairwise combinations of data points in, or data point pairs in some way representative of, the cluster are used.

As can be seen from the foregoing description, using tripoint arbitration based similarity analysis to detect anomalies addresses many difficulties with traditional techniques. This is because tripoint arbitration based similarity analysis makes no distributional or other assumptions about the data-generating mechanism and operates without tuning of parameters by the user. Anomalies can be detected with a desired false detection rate. Observations composed of heterogeneous components (e.g., numeric, text, categorical, time series, and so on) can be handled seamlessly by selecting an appropriate distance function.

Security Enhancement Using Anomaly Detection

In one embodiment, the detection of anomalies using tripoint arbitration is used to improve security of online services, storage environments, cloud computing environments, multi-tenant environments, and/or other computing environments. Such techniques can be implemented by a security module, such as hardware and/or software, configured to execute instructions for performing various computed implemented actions to modify operation of computing devices to improve security.

Data points, analyzed using tripoint arbitration, can relate to information associated with entities, such as computing devices, users, user accounts, etc. In one embodiment, a data point can correspond to information relating to a computing device attempting to access a user account with an online service, such as an email service, a banking service, an online shopping service, etc. The information can comprise a location of the computing device, an IP address of the computing device, device information of the computing device (e.g., a MAC address, a device type, a manufacturer, a model, etc.), a time of day when the attempt was made, etc. Such information can be extracted as features from electronic communications, received over a network, attempting to access the user account of the online service.

The data points, such as features extracted from electronic communications, can be analyzed using tripoint arbitration to detect an anomaly data point indicative of a computing device attempting to perform a malicious activity. The malicious activity can relate to the using of compromised credentials to gain unauthorized access to the user account with the online service. The malicious activity can relate to one or more computing devices, such as bots executing on the computing devices, performing a security attack.

A data point is determined by tripoint arbitration to be an anomaly data point when the data point is dissimilar from known data points. The anomaly data point represents malicious activity because a feature represented by the anomaly data point is dissimilar from expected features of non-malicious activities. That is, the data point represents a feature of the electronic communication, such as a location of a device that sent the electronic communication in an attempt to access the user account. The data point is compared to known data points of known locations of devices that routinely access the user account to perform non-malicious activities (e.g., locations from which an owner of the user account generally accesses the user account). If the data point, representing the location of the device, is dissimilar beyond a threshold amount from the known locations, then the data point is identified as the anomaly data point indicative of malicious activity, such as a malicious user attempting to access the user account from a strange location different from the known locations.

The security module can perform various actions to improve security upon detecting an anomaly data point representing malicious activity by a computing device. In one embodiment, the security module blocks further attempts by the computing device to access the online service. For example, the security module modifies a setting within a server or network device (e.g., a router, a gateway, etc.) to modify operation of the server or network device to block communication packets or authentication attempts received from the computing device. In this way, operation of the server or network device is modified in order to improve security against malicious computing devices.

In another embodiment, the security module modifies the user account to force the owner of the user account to reset an account password of the user account. In this way, the user account is protected against malicious attempts to access the user account. In another embodiment, the security module modifies the user account by implementing additional authentication verification or to change to a different type of authentication verification. This can force multifactor authentication for subsequent attempts by computing devices to access the user account.

In another embodiment, the security module modifies a setting within the server or network device to block an IP address of the computing device. The IP address is a feature from the electronic communication that is represented by the anomaly data point. A state of a network firewall implemented by the server or network device can be modified to block network communication from the IP address of the computing device.

In another embodiment where the anomaly data point is indicative of a security attack, the security module modifies a setting within the server or network device to change an IP address used by the online service. The security module can also modify a setting within the server or network device to block a port used by the online service.

In one embodiment of utilizing tripoint arbitration to improve security of an online service from a malicious device, an electronic communication is received by a computing device. The computing device, such as a server or network device, may implement the security module. The electronic communication is parsed to identify user account credentials, such as an email address and password, and an online service address of the online service. The electronic communication is stored in an unscored communications pool within memory of the computing device. The unscored communications pool may be isolated from a blocked communications pool and an allowed communication pool stored within the memory of the computing device. Once electronic communications are determined to be safe or malicious, then such electronic communications are transferred from the unscored communications pool to either the blocked communications pool or the allowed communications pool.

The electronic communication is evaluated to extract features as data points that are evaluated using tripoint arbitration to identify an anomaly data point indicative of the electronic communication being a malicious attack or a malicious attempt to gain unauthorized access to the user account. The anomaly data point is identified as a data point having one or more features that are dissimilar from known expected features. In one embodiment, the anomaly data point is identified where a data point representing a current location of a device that sent the electronic communication deviates a threshold amount from locations of devices routinely used to by the owner to access the user account in non-malicious ways. For example, the anomaly data point represents an attempt to access the user account from a foreign country, whereas the owner of the user account usually accesses the user account from home, such as within the last 20 minutes. In another embodiment, the anomaly data point is identified where an IP address of the device that sent the electronic communication deviates a threshold amount from IP addresses of devices routinely used to access the user account. In yet another embodiment, the anomaly data point is identified where device characteristics (e.g., a device model, a MAC address, a device type, etc.) of the device that sent the electronic communication deviates a threshold amount from device characteristics of devices routinely used to access the user account.

Detection of the anomaly data point is performed using tripoint arbitration and a set of known data points representing features of electronic communications routinely used to non-maliciously access the user account, such as IP addresses, device characteristics, times of access, device locations, etc. In this way, a wide variety of features can be used as data points for detecting anomaly data points indicative of malicious activity. If the anomaly data point is identified, then computerized actions can be taken upon the electronic communication and/or to modify operation of a computing device such as a server or network device associated with the online service. Such actions can comprise blocking further communication from the device by modifying settings within the server and/or network device. The settings can be modified by transmitting an instruction over a network to the server and/or network device to modify a setting, such as a setting to block a port, a setting to block communication from an IP address, a firewall setting, etc.

In one embodiment, the user identification, such as an email address, is extracted from the electronic communication. An account verification is performed to identify the existence of the user account. Features of the electronic communication such as a current location, device information, device IP address, and/or other features are extracted as data points for tripoint arbitration analysis. A modified electronic communication is created by appending the data points and account verification results to the electronic communication.

The modified electronic communication is scored to create a scored electronic communication. In one embodiment of scoring, recent user authentication behavior data is retrieved, such as from a database or other data structure within which user authentication behavior data is stored. The user authentication behavior data may comprise device login IP address data, device login location data, login times, device information, and/or other authentication behavior associated with the owner of the user account authenticating and accessing the user account for non-malicious activity. The recent user authentication behavior data is appended to the modified electronic communication. The recent user authentication behavior data can be used by tripoint anomaly detection as known data points of non-malicious behavior of the owner of the account. The modified electronic communication is scanned to determine whether the modified electronic communication is malicious communication by executing tripoint anomaly detection. The tripoint anomaly detection can use the recent user authentication behavior data as know data points to compare with data points of the features extracted from the electronic communication to determine similarity/dissimilarity between such for anomaly detection. If tripoint anomaly detection determines that one or more data points of features extracted from the modified electronic communication are anomaly data points, then the modified electronic communication is flagged as a malicious communication. Detecting malicious communication can be performed for other electronic communications received by the online service. Scores are assigned to modified electronic communications based upon how similar features of the modified electronic communications are to known expected behavior of the owner.

Figure 6:
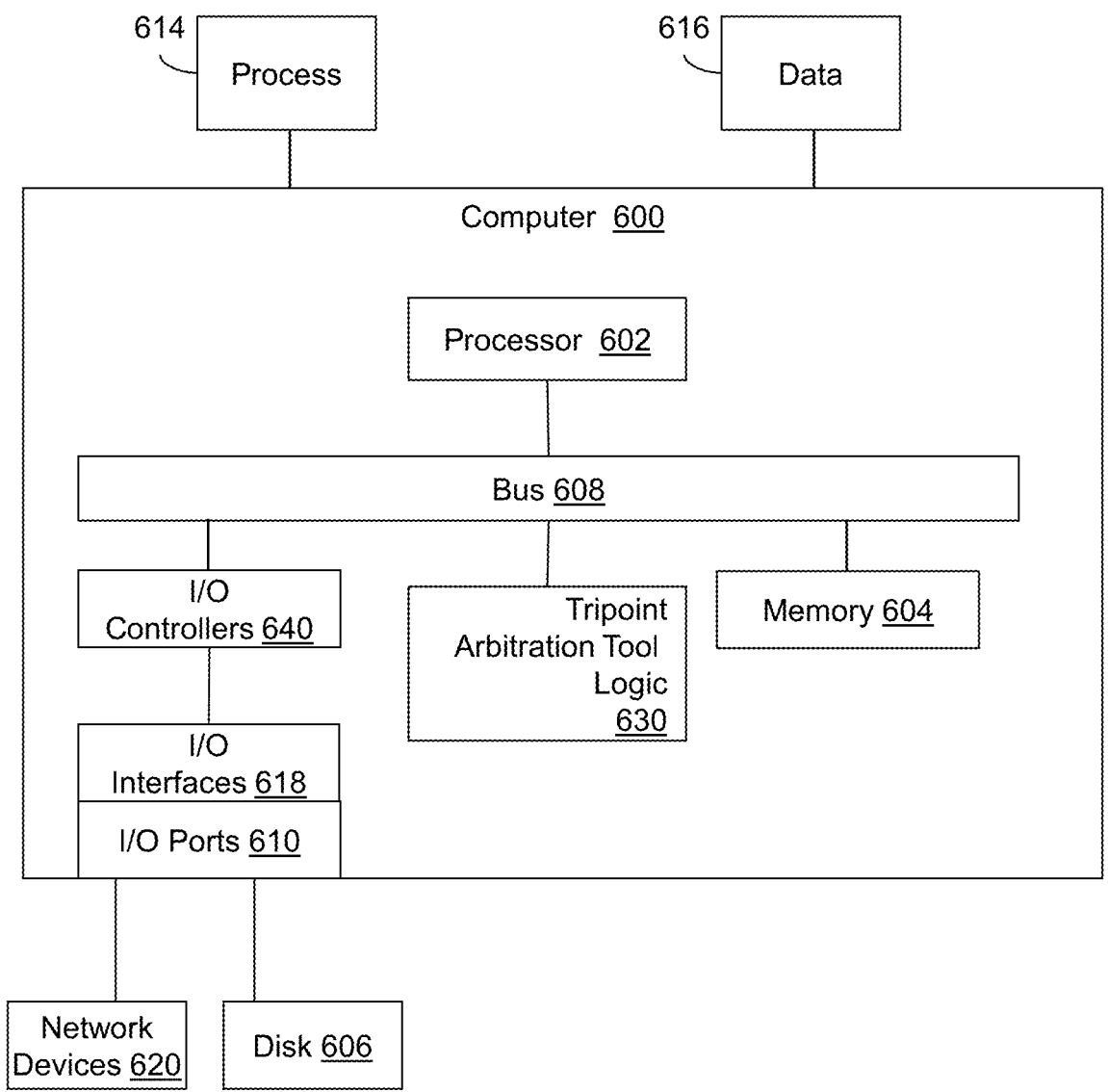
FIG. 6 illustrates an embodiment of a computing system configured with the example systems and/or methods disclosed.

A new data file can be created by copying the modified electronic communication and a score into a new data file as a scored communication file. The scored communication file is transferred into a scored communications pool. Once scored communication files are created from electronic communications within the unscored communications pool and are transferred to the scored communications pool, remaining data within the unscored communications pool is deleted. Scores of the scored communication files within the scored communications pool are evaluated to determine whether such scored communication files are to be moved into the blocked communications pool or the allowed communications pool. If a score of a scored communication file exceeds a threshold indicative of malicious communication, then the scored communication file is moved to the blocked communications pool. Otherwise, the scored communications file is moved to the allowed communications pool. Scored communication files within the blocked communications pool are blocked from accessing the user account and/or from being normally processed by the online service. Scored communication files within the allowed communications pool are allowed to access the user account and/or are processed normally by the online service Computer Embodiment FIG. 6 illustrates an example computing device that is configured and/or programmed with one or more of the example systems and methods described herein, and/or equivalents. The example computing device may be a computer 600 that includes a processor 602, a memory 604, and input/output ports 610 operably connected by a bus 608. In one example, the computer 600 may include tripoint arbitration tool logic 630 configured to facilitate similarity analysis, clustering, and/or anomaly detection using tripoint arbitration. The tripoint arbitration tool logic may be similar to the tripoint arbitration tool logic 400 in FIG. 4. In different examples, the logic 630 may be implemented in hardware, a non-transitory computer-readable medium with stored instructions, firmware, and/or combinations thereof. While the logic 630 is illustrated as a hardware component attached to the bus 608, it is to be appreciated that in one example, the logic 630 could be implemented in the processor 602.

In one embodiment, logic 630 or the computer is a means (e.g., hardware, non-transitory computer storage medium, firmware) for detecting anomalies using tripoint arbitration.

The means may be implemented, for example, as an ASIC programmed to detect anomalies using tripoint arbitration. The means may also be implemented as stored computer executable instructions that are presented to computer 600 as data 616 that are temporarily stored in memory 604 and then executed by processor 602.

Logic 630 may also provide means (e.g., hardware, non-transitory computer storage medium that stores executable instructions, firmware) for performing the methods described above with respect to FIGS. 1-5.

Generally describing an example configuration of the computer 600, the processor 602 may be a variety of various processors including dual microprocessor and other multi-processor architectures. A memory 604 may include volatile memory and/or non-volatile memory. Non-volatile memory may include, for example, ROM, PROM, and so on. Volatile memory may include, for example, RAM, SRAM, DRAM, and so on.

A storage disk 606 may be operably connected to the computer 600 via, for example, an input/output interface (e.g., card, device) 618 and an input/output port 610. The disk 606 may be, for example, a magnetic disk drive, a solid state disk drive, a floppy disk drive, a tape drive, a Zip drive, a flash memory card, a memory stick, and so on. Furthermore, the disk 606 may be a CD-ROM drive, a CD-R drive, a CD-RW drive, a DVD ROM, and so on. The memory 604 can store a process 614 and/or a data 616, for example. The disk 606 and/or the memory 604 can store an operating system that controls and allocates resources of the computer 600.

The computer 600 may interact with input/output devices via the i/o interfaces 618 and the input/output ports 610. Input/output devices may be, for example, a keyboard, a microphone, a pointing and selection device, cameras, video cards, displays, the disk 606, the network devices 620, and so on. The input/output ports 610 may include, for example, serial ports, parallel ports, and USB ports.

The computer 600 can operate in a network environment and thus may be connected to the network devices 620 via the i/o interfaces 618, and/or the i/o ports 610. Through the network devices 620, the computer 600 may interact with a network. Through the network, the computer 600 may be logically connected to remote computers. Networks with which the computer 600 may interact include, but are not limited to, a LAN, a WAN, and other networks.

In another embodiment, the described methods and/or their equivalents may be implemented with computer executable instructions. Thus, in one embodiment, a non-transitory computer storage medium is configured with stored computer executable instructions that when executed by a machine (e.g., processor, computer, and so on) cause the machine (and/or associated components) to perform the methods described in FIGS. 3 and/or 5.

While for purposes of simplicity of explanation, the illustrated methodologies in the figures are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional actions that are not illustrated in blocks. The methods described herein are limited to statutory subject matter under 35 U.S.C § 101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer storage medium", as used herein, is a non-transitory medium that stores instructions and/or data. A computer storage medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer storage media may include, but are not limited to, a floppy disk, a flexible disk, a hard disk, a magnetic tape, other magnetic medium, an ASIC, a CD, other optical medium, a RAM, a ROM, a memory chip or card, a memory stick, and other electronic media that can store computer instructions and/or data. Computer storage media described herein are limited to statutory subject matter under 35 U.S.C § 101.

"Logic", as used herein, includes a computer or electrical hardware component(s), firmware, a non-transitory computer storage medium that stores instructions, and/or combinations of these components configured to perform a function(s) or an action(s), and/or to cause a function or action from another logic, method, and/or system. Logic may include a microprocessor controlled by an algorithm, a discrete logic (e.g., ASIC), an analog circuit, a digital circuit, a programmed logic device, a memory device containing instructions that when executed perform an algorithm, and so on. Logic may include one or more gates, combinations of gates, or other circuit components. Where multiple logics are described, it may be possible to incorporate the multiple logics into one physical logic component. Similarly, where a single logic unit is described, it may be possible to distribute that single logic unit between multiple physical logic components. Logic as described herein is limited to statutory subject matter under 35 U.S.C § 101.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this disclosure is intended to embrace alterations, modifications, and variations that fall within the scope of the appended claims, which satisfy the statutory subject matter requirements of 35 U.S.C. § 101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

What is claimed is:

1. A non-transitory computer storage medium storing computer-executable instructions that when executed by a computer including at least a processor and a memory, wherein the instructions are configured to cause the computer to:

identify, by at least the processor, a set of clusters that correspond to a nominal sample of data points, wherein each cluster in the set of clusters includes a group of data points from the nominal sample that are similar to each other, wherein the data points correspond to features extracted from electronic communications associated with a service;

receive, by at least the processor, an electronic communication attempting to access the service;

extract, by at least the processor, a data point z corresponding to a feature of the electronic communication attempting to access the service;

determine, by at least the processor, whether the electronic communication is associated with a malicious activity by performing at least:

for each cluster in the set of clusters, determine, by at least the processor, a tripoint arbitration similarity between data point pairs in the cluster calculated with the data point z as an arbiter point, wherein the tripoint arbitration similarity is determined as a positive similarity between a first data point and a second data point of a data point pairing based at least in part upon a first distance between the arbiter point and the first data point and a second distance between the arbiter point and the second data point being greater than a third distance between the first data point and the second data point, wherein the tripoint arbitration similarity is a function of a ratio of a first value and a second value, wherein the first value is a difference between the third distance and a minimum value between the first distance and the second distance, wherein the second value is a maximum value between the third distance and the minimum value;

compare the tripoint arbitration similarity to a threshold for detecting anomalies within a false detection rate without making assumptions about the nominal sample of data points;

based on the comparison, determine, by at least the processor, that the data point z is an anomaly point that is dissimilar to the nominal sample of data points thereby indicating being associated with the malicious activity; and in response to determining that the data point z is associated with the malicious activity, execute an action to block the electronic communication from accessing the service.

2. The non-transitory computer storage medium of claim 1, wherein the instructions to execute the action comprise instructions to:

execute an instruction to modify a setting within a computing device hosting the service to block the electronic communication.

3. The non-transitory computer storage medium of claim 1, wherein the instructions to execute the action comprise instructions to:

execute an instruction to modify a firewall setting within a computing device hosting the service to block communication from a device that sent the electronic communication.

4. A non-transitory computer storage medium storing computer-executable instructions that when executed by a computer including at least a processor and a memory, wherein the instructions are configured to cause the computer to:

identify, by at least the processor, a set of clusters that correspond to a nominal sample of data points, wherein each cluster in the set of clusters includes a group of data points from the nominal sample that are similar to each other, wherein the data points correspond to features extracted from electronic communications associated with a service;

receive, by at least the processor, a data point z corresponding to a feature of an electronic communication attempting to access the service;

for each cluster in the set of clusters, determine, by at least the processor, a tripoint arbitration similarity between data point pairs in the cluster calculated with the data point z as an arbiter point, wherein the tripoint arbitration similarity is determined as a positive similarity between a first data point and a second data point of a data point pairing based at least in part upon a first distance between the arbiter point and the first data point and a second distance between the arbiter point and the second data point being greater than a third distance between the first data point and the second data point, wherein the tripoint arbitration similarity is a function of a ratio of a first value and a second value, wherein the first value is a difference between the third distance and a minimum value between the first distance and the second distance, wherein the second value is a maximum value between the third distance and the minimum value;

compare the tripoint arbitration similarity to a threshold for detecting anomalies within a false detection rate without making assumptions about the nominal sample of data points;

based on the comparison, determine, by at least the processor, that the data point z is an anomaly point that is dissimilar to the nominal sample of data points; and execute an action to block the electronic communication from accessing the service, wherein the instructions to execute the action comprise instructions to:

execute an instruction to block a user account of the service to which the electronic communication was requesting access.

5. The non-transitory computer storage medium of claim 1, wherein the instructions to execute the action comprise instructions to:

execute an instruction to modify a user account of the service to which the electronic communication was requesting access, wherein the modification changes an authentication mechanism used to authenticate with the service for access to the user account.

6. The non-transitory computer storage medium of claim 1, wherein the instructions further include instructions that when executed by the processor cause the computer to identify the set of clusters by:

identifying a current set of clusters in the nominal sample;
partitioning data points in each cluster into two subclusters based on tripoint similarities between pairs of the data points in the cluster;
determining whether a set of constraints are met; and
when the set of constraints are not met, outputting the current set of clusters as corresponding to the nominal sample;

wherein the set of constraints comprises:
data point pairs comprising data points from the same subcluster have a positive tripoint arbitration similarity with respect to one another; and
data point pairs comprising a data point from one of the two subclusters and a data point from the other of the two subclusters have a negative tripoint arbitration similarity;
wherein the tripoint arbitration similarity is calculated based on data points representative of the nominal sample as arbiters.

7. The non-transitory computer storage medium of claim 1, wherein the threshold is based, at least in part, on a false detection rate set as a percentage.

8. A computing system, comprising:
at least one processor and a memory;
a non-transitory computer-storage medium connected to the at least one processor by a communication path; and
anomaly detection logic stored in the non-transitory computer-storage medium and comprising stored instructions that when executed by the at least one processor cause the at least one processor to:

receive, by at least the processor, a data point z for comparison with a nominal sample of data points, wherein the data point z corresponds to a feature of an electronic communication attempting to access the service;

identify, by at least the processor, a set of clusters that correspond to the nominal sample of data points, wherein each cluster in the set of clusters includes a group of data points from the nominal sample that are similar to each other, wherein the data points correspond to features extracted from electronic communications associated with a service;

for each cluster in the set of clusters, determine a tripoint arbitration similarity between data point pairs in the cluster calculated with the data point z as an arbiter point, wherein the tripoint arbitration similarity is determined as a positive similarity between a first data point and a second data point of a data point pairing based at least in part upon a first distance between the arbiter point and the first data point and a second distance between the arbiter point and the second data point being greater than a third distance between the first data point and the second data point, wherein the tripoint arbitration similarity is a function of a ratio of a first value and a second value, wherein the first value is a difference between the third distance and a minimum value between the first distance and the second distance, wherein the second value is a maximum value between the third distance and the minimum value;

compare the tripoint arbitration similarity to a threshold for detecting anomalies within a false detection rate without making assumptions about the nominal sample of data points;

based on the comparison, determine that the data point z is an anomaly point that is dissimilar to the nominal sample of data points; and execute an action to block the electronic communication from accessing the service including execute an instruction to modify a setting within a computing device hosting the service to block at least an internet protocol (IP) address of a device that sent the electronic communication or a port over which the electronic communication was received.

9. The computing system of claim 8, further comprising tripoint arbitration logic stored in the non-transitory computer-storage medium and comprising stored instructions that when executed by the at least one processor cause the at least one processor to calculate the tripoint arbitration similarity between data points in a cluster with the data point z as the arbiter point by:

selecting, from the cluster, data point pairs corresponding to pairwise combinations of the data points in the cluster; and for each data point pair, calculating a respective z-based per-pair tripoint arbitration similarity for the data point pair using the data point z as the arbiter point; and combining the z-based per-pair tripoint arbitration similarities to calculate the tripoint arbitration similarity between the data points in the cluster with the data point z as the arbiter point.

10. The computing system of claim 9, wherein the tripoint arbitration logic is configured to calculate the z-based per-pair similarity ($S_z$) for a data point pair ($x_1$, $x_2$), where $\rho$ is a distance between points, using the formula:

$$S_z(x_1, x_2) = \frac{\min\{\rho(x_1, z), \rho(x_2, z)\} - \rho(x_1, x_2)}{\max\{\rho(x_1, x_2), \min\{\rho(x_1, z), \rho(x_2, z)\}\}}.$$

11. The computing system of claim 8, wherein the anomaly detection logic further includes instructions that when executed by the at least one processor cause the at least one processor to:

for each cluster, define a range of data values in the nominal sample of data points such that the data points having values in the range will, when used as an arbiter point, result in a tripoint arbitration similarity between the data points in the cluster that is greater than the threshold; and define an intersection of the respective ranges for the respective clusters as an anomaly region;

such that a data point z having a value that falls in the anomaly region is determined to be an anomaly with respect to the nominal sample.

12. The computing system of claim 8, further comprising clustering logic stored in the non-transitory computer-storage medium and comprising stored instructions that when executed by the at least one processor cause the at least one processor to find the set of clusters by:

identifying a current set of clusters in the nominal sample of data points;

partitioning the data points in each cluster into two subclusters based on tripoint similarities between pairs of the data points;

determining whether a set of constraints are met; and when the set of constraints are not met, outputting the current set of clusters as corresponding to the nominal sample;

wherein the set of constraints comprises:
the data point pairs comprising data points from the same subcluster have a positive tripoint arbitration similarity with respect to one another; and
the data point pairs comprising a data point from one of the two subclusters and a data point from the other of the two subclusters have a negative tripoint arbitration similarity;
wherein the tripoint arbitration similarity is calculated based on the data points representative of the nominal sample as arbiters.

13. A computer-implemented method, comprising:
identifying, by at least a processor, a set of clusters that correspond to a nominal sample of data points, wherein each cluster in the set of clusters includes a group of data points from the nominal sample that are similar to each other, wherein the data points correspond to features extracted from electronic communications associated with a service;

receiving, by at least the processor, a data point z corresponding to a feature of an electronic communication attempting to access the service;

for each cluster in the set of clusters, determining, by at least the processor, a tripoint arbitration similarity between data point pairs in the cluster calculated with the data point z as an arbiter point, wherein the tripoint arbitration similarity is determined as a positive similarity between a first data point and a second data point of a data point pairing based at least in part upon a first distance between the arbiter point and the first data point and a second distance between the arbiter point and the second data point being greater than a third distance between the first data point and the second data point, wherein the tripoint arbitration similarity is a function of a ratio of a first value and a second value, wherein the first value is a difference between the third distance and a minimum value between the first distance and the second distance, wherein the second value is a maximum value between the third distance and the minimum value;

comparing, by at least the processor, the tripoint arbitration similarity to a threshold for detecting anomalies within a false detection rate without making assumptions about the nominal sample of data points;

based on the comparison, determining, by at least the processor, that the data point z is an anomaly point that is dissimilar to the nominal sample of data points; and executing an action to block the electronic communication from accessing the service.

14. The computer-implemented method of claim 13, wherein a single cluster corresponds to the nominal sample.

15. The computer-implemented method of claim 13, further comprising calculating the tripoint arbitration similarity between the data points in the cluster with the data point z as the arbiter point by:

selecting, from the cluster, the data point pairs corresponding to pairwise combinations of the data points in the cluster; and for each data point pair, calculating a respective z-based per-pair tripoint arbitration similarity for the data point pair using the data point z as the arbiter point; and combining the z-based per-pair tripoint arbitration similarities to calculate the tripoint arbitration similarity between the data points in the cluster with the data point z as the arbiter point.

16. The computer-implemented method of claim 15, further comprising calculating the z-based per-pair similarity ($S_z$) for a data point pair ($x_1$, $x_2$), where $\rho$ is a distance between points, using the formula:

$$S_z(x_1, x_2) = \frac{\min\{\rho(x_1, z), \rho(x_2, z)\} - \rho(x_1, x_2)}{\max\{\rho(x_1, x_2), \min\{\rho(x_1, z), \rho(x_2, z)\}\}}.$$

17. The computer-implemented method of claim 13, further comprising:

for each cluster, defining, by at least the processor, a range of data values in the nominal sample such that the data points having values in the range will, when used as an arbiter point, result in a tripoint arbitration similarity between the data points in the cluster that is greater than the threshold; and defining, by at least the processor, an intersection of the respective ranges for the respective clusters as an anomaly region;

such that the data point z having a value that falls in the anomaly region is determined to be an anomaly with respect to the nominal sample.

18. The computer-implemented method of claim 13, further comprising identifying the set of clusters by:

identifying, by at least the processor, a current set of clusters in the nominal sample;

partitioning, by at least the processor, data points in each cluster into two subclusters based on tripoint similarities between pairs of the data points in the cluster;

determining, by at least the processor, whether a set of constraints are met; and when the set of constraints are not met, outputting, by at least the processor, the current set of clusters as corresponding to the nominal sample;

wherein the set of constraints comprises:

data point pairs comprising data points from the same subcluster have a positive tripoint arbitration similarity with respect to one another; and data point pairs comprising a data point from one of the two subclusters and a data point from the other of the two subclusters have a negative tripoint arbitration similarity;

wherein the tripoint arbitration similarity is calculated based on data points representative of the nominal sample as arbiters.

19. The computer-implemented method of claim 13, further comprising generating an alert in response to the data point z being determined as the anomaly point that is an outlier with respect to the set of clusters.

* * * * *

UNITED STATES PATENT AND TRADEMARK OFFICE
CERTIFICATE OF CORRECTION

PATENT NO. : 10,992,675 B2  
APPLICATION NO. : 15/843641  
DATED : April 27, 2021  
INVENTOR(S) : Urmanov et al.

Page 1 of 1

It is certified that error appears in the above-identified patent and that said Letters Patent is hereby corrected as shown below:

On the Title Page

On page 2, Column 1, item (56) under Other Publications, Line 13, delete "Hompage" and insert -- Homepage --, therefor.

In the Drawings

On sheet 3 of 6, in FIG. 3, under Reference Numeral 320, Line 1, delete "Sublusters" and insert -- Subclusters --, therefor.

In the Specification

In Column 3, Line 5, delete "points," and insert -- points --, therefor.

In Column 5, Line 4, delete "($x_{i(1)}, x_{j(1)}$" and insert -- ($x_{i(1)}, x_{j(1)}$) --, therefor.

In Column 5, Line 8, delete "($x_{i(1)}, x_{j(1)}$" and insert -- ($x_{i(1)}, x_{j(1)}$) --, therefor.

In Column 5, Line 21, delete "When both".

In Column 5, Line 43, delete "($x_1, x_j$)" and insert -- ($x_i, x_j$) --, therefor.

In Column 6, Line 61, delete "minimized)" and insert -- minimized). --, therefor.

In Column 8, Line 12, delete "I" and insert -- 1 --, therefor.

In Column 13, Line 30, delete "service" and insert -- service. --, therefor.

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*